S. STANBRO.
Seed Dropper.

No. 21,452.

Patented Sept. 7, 1858.

UNITED STATES PATENT OFFICE.

SAML. STANBRO, OF SALEM, MICHIGAN.

IMPROVEMENT IN SEEDING-MACHINES.

Specification forming part of Letters Patent No. 21,452, dated September 7, 1858.

*To all whom it may concern:*

Be it known that I, SAMUEL STANBRO, of Salem, county of Washtenaw, State of Michigan, have invented certain new and useful Improvements in Seed-Sowers, of which the following is a full, clear, and exact description, reference being had to the accompanying drawings, forming part of this specification, in which—

Figure 1:
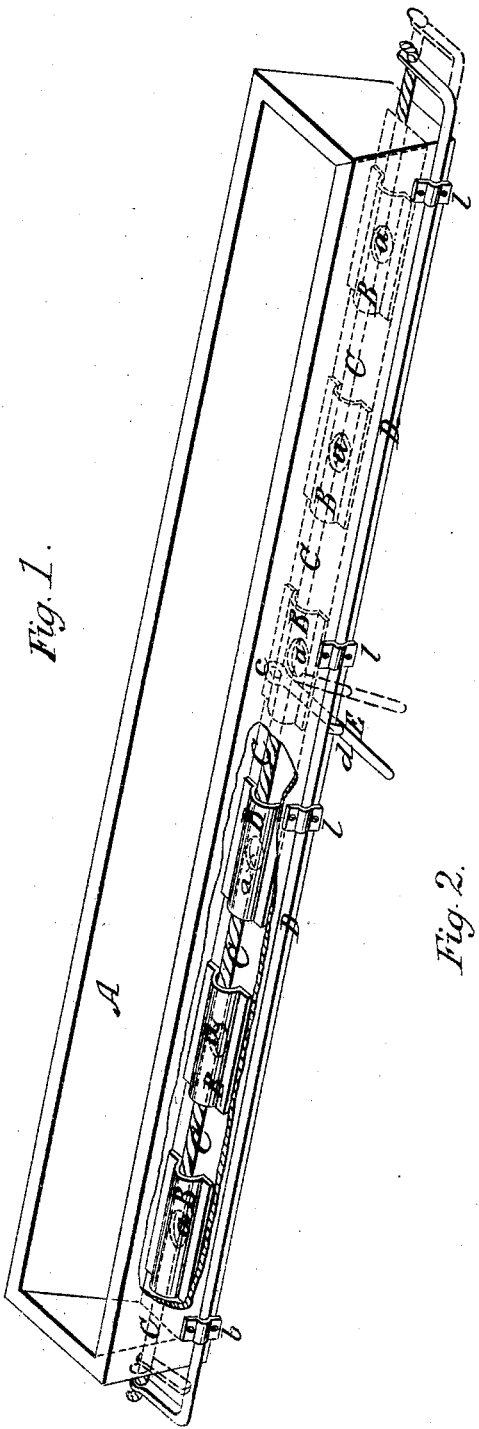
Figure 2:
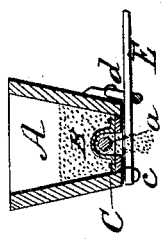

Figure 1 represents a perspective view of a seed-sower embracing my improvements, and Fig. 2 represents a vertical transverse section of the same.

My improvement in seed sowers or planters is more particularly adapted for those in which the vibrating measurers and carriers are generally used to measure and convey the seed to the discharge-openings in the bottom of the seed-box. These carriers as heretofore constructed are liable to break the seed and the openings into the measuring-cavities to be clogged by large seed and chaff, which are usually found mingled with the small seed, thus obstructing the regular and uniform delivery of the seed to hill or drill. These carriers also require experienced and skillful mechanics to construct and fit them to the machine so that they will work evenly and smoothly. Consequently their renewal, when worn or broken, is both expensive and troublesome, requiring men of more skill than the generality of farm-laborers to replace them.

The object of my invention is to overcome these defects in the measuring-conveyer and diminish the cost of its construction; and my invention for effecting this object consists in the application of a twisted cord as a conveyer, in connection with a series of curved bridges through which the cord vibrates, which forms a cheap and effective conveyer and measurer that is not liable to break the seed or become choked by large seed or chaff, that can be replaced, when worn, at slight cost and little trouble, by any ordinary workman without the assistance of a mechanic.

The accompanying drawings represent a seed-sower to which my improvement is attached, and which consists of a long rectangular box, A, with sloping sides for holding the seed, the bottom of which is punctured with a series of holes, $a$, at regular intervals, through which the seed escapes. These holes are covered by a series of semi-cylindrical tubes, B, running longitudinally, and open at both ends. A twisted cord, C, of any soft or yielding substance, extends longitudinally through the box, passing through the measuring-tubes and partially covering the discharge-openings. The ends of the cord are attached outside the box to a bent rod, D, which traverses in guides $l$, and reciprocating motion is given to the rod D, and also to cord C, by a lever, E, pivoted to the under side of the box, and passing through a slot or notch, $d$, in the rod. At the end of its motion in either direction the ends of the rod strike against the ends of the box, communicating to it a jar which causes the heavy and perfect seed to sink to the bottom and pass into the ends of the measuring-tubes, while the light, shriveled, and imperfect seed remain on top. The spiral channels on the surface of the twisted cord C form conveyers which carry the seed, as the cord vibrates, into the tubes, from whence it passes around the cord and is discharged through the openings in the bottom of the box. These grooves in the vibrating cord carry into the tubes at each vibration an equal amount of seed, so that the distribution of it is rendered uniform and regular.

The length of the vibrations of the conveyer, and consequently the amount of seed delivered at each vibration, may be varied by means of an adjustable set-screw placed in the end of the box, against which the end of the vibrating rod strikes at the end of its motion.

The size of the tubes and the diameter of the conveying-cord are proportioned to the size of the seed, so that they can freely enter into the end of the tube and pass around the cord without being injured.

It will be seen that the seed is carried horizontally into the end of the measuring-tube by a positive motion of the carrier, and that the uniformity of the measurer does not depend upon the action of gravity, and is not affected by the seed being damp. Neither is the opening in the measurer liable to be choked or clogged by large seed or chaff, as the delivery-opening beneath the measuring-tube is made sufficiently large for their escape, and whatever is carried into the tube and not delivered is, on the retrograde movement of carrier, withdrawn therefrom. From the form of the carrying-surface and the yielding material of which the carrier is made, as well as from the seed being conveyed horizontally, they are not liable to be crowded into the tube and broken. Neither are seeds that only partially enter the tube subject to this liability, as the carrier passes over the seeds that offer slight resistance to being carried forward without breaking them.

The advantages of this description of carrier and measurer over those heretofore used are that it is neither liable to break seed or to clog, so as to affect the uniformity and regularity with which the seed is delivered, and that its first cost is less, and that it can be easily repaired or replaced by the ordinary farm-hands without delaying the machine, and at small cost.

Having thus described my improvements in seed-sowers, what I claim therein as new, and desire to secure by Letters Patent, is—

The application of a twisted cord, in combination with measuring-tubes arranged, substantially as described, for the purpose of measuring and delivering the seed.

In testimony whereof I have subscribed my name.

SAMUEL STANBRO.

Witnesses:
GEO. A. STARKWEATHER,
HENRY FRALICK.